US006635728B2

(12) United States Patent
Liu

(10) Patent No.: US 6,635,728 B2
(45) Date of Patent: Oct. 21, 2003

(54) PREPARATION OF ULTRA-HIGH-MOLECULAR-WEIGHT POLYETHYLENE

(75) Inventor: Jia-Chu Liu, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/044,489

(22) Filed: Jan. 10, 2002

(65) Prior Publication Data

US 2003/0130448 A1 Jul. 10, 2003

(51) Int. Cl.[7] .................................................. C08F 4/42
(52) U.S. Cl. .................... 526/161; 526/352; 526/348; 526/172; 526/129; 502/200; 502/202; 502/87; 502/152
(58) Field of Search ............... 526/352, 348, 526/161, 172, 129; 502/200, 202, 87, 152

(56) References Cited

U.S. PATENT DOCUMENTS

| 3,642,746 | A | * | 2/1972 | Kashiwa et al. ........... 260/88.2 |
| 5,064,802 | A | | 11/1991 | Stevens et al. ............. 502/155 |
| 5,444,145 | A | | 8/1995 | Brant et al. ............... 526/348.3 |
| 5,599,761 | A | | 2/1997 | Turner ....................... 502/152 |
| 5,756,600 | A | | 5/1998 | Okumura et al. ........... 525/528 |
| 5,756,611 | A | | 5/1998 | Etherton et al. ............ 526/127 |
| 6,211,311 | B1 | * | 4/2001 | Wang et al. ................ 526/131 |
| 6,265,504 | B1 | * | 7/2001 | Liu et al. ................... 526/161 |

OTHER PUBLICATIONS

U.S. application Ser. No. 09/781,464, Filed Feb. 12, 2001, "Supported Single–Site Catalysts Useful for Olefin Polymerization". Jia–Chu Liu (Docket No. 88–1035A).

* cited by examiner

Primary Examiner—Ling-Siu Choi
(74) Attorney, Agent, or Firm—Shao Guo

(57) ABSTRACT

A process for making an ultra-high-molecular-weight polyethylene (UHMWPE) is disclosed. The process is performed with a supported quinolinoxy-containing single-site catalyst in the presence of a non-alumoxane activator, but in the absence of an α-olefin, an aromatic solvent, and hydrogen. The process significantly increases the catalyst activity and the UHMWPE produced has improved tensile and impact properties.

10 Claims, No Drawings

PREPARATION OF ULTRA-HIGH-MOLECULAR-WEIGHT POLYETHYLENE

FIELD OF THE INVENTION

The invention relates to a process for making an ultra-high-molecular-weight polyethylene (UHMWPE). More particularly, the invention relates to a process for making an UHMWPE with a supported transition metal catalyst having at least one quinolinoxy ligand.

BACKGROUND OF THE INVENTION

Ultra-high-molecular-weight polyethylene (UHMWPE) has a molecular weight that is 10 to 20 times greater than high-density polyethylene (HDPE). It has been defined by ASTM as having a weight average molecular weight (Mw) greater than 3,000,000. In addition to the chemical resistance, lubricity, and excellent electrical properties of conventional HDPE, UHMWPE offers major advantages in toughness, abrasion resistance, and freedom from stress-cracking.

UHMWPE is produced by Ziegler polymerization. For example, U.S. Pat. No. 5,756,600 teaches a process for making UHMWPE with Ziegler catalysts. The process requires exceptionally pure ethylene and other raw materials. An α-olefin comonomer, such as 1-butene, may be incorporated into UHMWPE according to U.S. Pat. No. 5,756,600. Like conventional HDPE, UHMWPE made by Ziegler polymerization has a broad molecular weight distribution.

Newly developed single-site catalysts advantageously provide polyethylene and other polyolefins with narrow molecular weight distribution (Mw/Mn from 1 to 5). The narrow molecular weight distribution is a reflection of reduced low molecular weight species. These new catalysts also significantly enhance incorporation of long-chain α-olefin comonomers into polyethylene, and therefore reduce its density.

It is difficult to produce UHMWPE with single-site catalysts. For example, U.S. Pat. No. 5,444,145 teaches preparation of polyethylene having a weight average molecular weight up to 1,000,000 with a cyclopentadienyl-based single-site catalyst. However, its molecular weight is significantly lower than that required for UHMWPE.

U.S. Pat. No. 6,265,504 teaches a process for making an UHMWPE with an unsupported heteroatomic ligand-containing single-site catalyst. The process, however, has low catalyst activity and the UHMWPE produced has relatively low tensile and impact properties.

A new process for making UHMWPE is needed. Ideally, the process would give high catalyst activity and produce an UHMWPE having improved tensile and impact properties.

SUMMARY OF THE INVENTION

The invention is a process for preparing an ultra-high-molecular-weight polyethylene (UHMWPE). The process comprises supporting a single-site catalyst comprising a Group 3–10 transition or lanthanide metal and a quinolinoxy ligand onto a support and polymerizing ethylene in the presence of the supported catalyst and a non-alumoxane activator. The polymerization is performed at a temperature within the range of about 40° C. to about 110° C. in the absence of an aromatic solvent, an α-olefin comonomer, and hydrogen.

The process of the invention has high catalyst activity and produces UHMWPE that has improved tensile properties and impact resistance.

DETAILED DESCRIPTION OF THE INVENTION

The invention is a process for making an ultra-high-molecular-weight polyethylene (UHMWPE). The process comprises supporting a single-site catalyst comprising a Group 3–10 transition or lanthanide metal and a quinolinoxy ligand onto a support. Preferably, the single-site catalyst comprises a Group 4 transition metal. More preferably, the transition metal is titanium or zirconium.

The total number of ligands satisfies the valence of the transition metal. Other suitable ligands include substituted or unsubstituted cyclopentadienyls, indenyls, and fluorenyls, halides, $C_1$–$C_{10}$ alkyls, $C_6$–$C_{15}$ aryls, $C_7$–$C_{20}$ aralkyls, dialkylamino, thioether, siloxy, alkoxy, and the like, and mixtures thereof. Benzyl, halide, cyclopentadienyl, and indenyl ligands are preferred. Benzyl ligands are particularly preferred. More preferably, the transition metal catalyst contains one quinolinoxy and three benzyl ligands.

The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 10 to about 900 $m^2$/g, a pore volume in the range of about 0.1 to about 4.0 mL/g, an average particle size in the range of about 10 to about 500 μm, and an average pore diameter in the range of about 10 to about 1000 Å. The support is preferably modified by heat treatment, chemical modification, or both. For heat treatment, the support is preferably heated at a temperature from about 50° C. to about 800° C. More preferably, the temperature is from about 100° C. to about 400° C.

Suitable chemical modifiers include organoaluminum, organosilicon, organomagnesium, and organoboron compounds. Organosilicon and organoboron compounds, such as hexamethyldisilazane (HMDS) and triethylborane, are preferred. Suitable techniques for treating a support are taught, for example, by U.S. Pat. No. 6,211,311, the teachings of which are incorporated herein by reference.

Preferably, the supporting involves treating a support with organosilicon compounds, calcining the treated support, treating the calcined support with organomagnesium compounds, mixing the organomagnesium-treated support with a quinolinoxy ligand-containing single-site catalyst, and then removing any solvents from the supported catalyst. More preferably, the supporting is performed by (1) treating a silica support with HMDS, (2) calcining the HMDS-treated silica (3) treating the calcined silica with dibutylmagnesium, (4) mixing the treated silica of step 3 with a quinolinoxy ligand-containing single-site catalyst, and (5) removing any solvents. Example 1 shows a detailed procedure of supporting the catalyst.

Other suitable supporting techniques may be used. For example, the catalyst may be supported by using the method taught by co-pending application Ser. No. 09/781,464. First, a quinolinol is deprotonated to produce an anionic ligand precursor. Second, the anionic ligand precursor reacts with about 0.5 equivalent of a transition metal compound to give a mixture that contains quinolinoxy ligand-containing catalyst. Third, the mixture reacts with a non-alumoxane activator. Fourth, the product from step three is combined with a support. Finally, the solvents are removed to give a solid, supported catalyst.

Suitable non-alumoxane activators include alkyl aluminums, alkyl aluminum halides, anionic compounds of boron or aluminum, trialkylboron and triarylboron compounds, and the like. Examples are triethylaluminum, trimethylaluminum, diethylaluminum chloride, lithium tetrakis(pentafluorophenyl) borate, triphenylcarbenium tetrakis(pentafluorophenyl) borate, lithium tetrakis (pentafluorophenyl) aluminate, tris(pentafluorophenyl) boron, tris(pentabromophenyl) boron, and the like. Other suitable activators are known, for example, in U.S. Pat. Nos. 5,756,611, 5,064,802, and 5,599,761, and their teachings are incorporated herein by reference. Alumoxane compounds, such as methyl alumoxane or ethyl alumoxane, are not suitable activators for the process of the invention. When an alumoxane activator is used, UHMWPE cannot be made.

Activators are generally used in an amount within the range of about 0.01 to about 100,000, preferably from about 0.1 to about 1,000, and most preferably from about 0.5 to about 50, moles per mole of the catalyst.

The polymerization is conducted at a temperature within the range of about 40° C. to 110° C., preferably about 50° C. to 80° C. A high polymerization temperature results in a low molecular weight of polyethylene. If the temperature is too high, UHMWPE cannot be obtained.

The polymerization is preferably conducted under pressure. The reactor pressure is preferably within the range of about 100 to about 5,000 psi, more preferably from about 300 to about 3,000 psi, and most preferably from about 500 to about 2,000 psi. Generally, the higher the pressure, the more productive the process.

The process of the invention includes slurry and gas phase polymerizations. The process is conducted in the absence of an aromatic solvent. Saturated aliphatic and cyclic hydrocarbons are suitable solvents. Preferred solvents include pentane, hexane, heptane, octane, isobutane, cyclohexane, and the like, and mixtures thereof. Using an aromatic solvent in the process reduces the molecular weight of polyethylene. UHMWPE cannot be obtained when an aromatic solvent is used.

The process of the invention is performed in the absence of hydrogen or any other chain transfer agent. Using hydrogen in the process reduces the molecular weight of the polyethylene. UHMWPE cannot be obtained in the presence of hydrogen.

The process of the invention is conducted in the absence of other α-olefin comonomers such as propylene, 1-butene, or 1-hexene. Incorporation of an α-olefin comonomer reduces the molecular weight of polyethylene. UHMWPE cannot be obtained when an α-olefin comonomer is used.

I have surprisingly found that the process of the invention gives much higher catalyst activity than the known process (see Table 1). For instance, when 8-quinolinoxytitanium tribenzyl is supported (Example 3), the catalyst activity is more than 6 times greater than that when the catalyst is not supported (Comparative Example 4). More surprisingly, UHMWPE produced by the process of invention shows significantly improved tensile properties and impact resistance (see Table 2).

UHMWPE made by the process of the invention has a Mw that is greater than about 3,000,000 and Mw/Mn less than about 5. Preferably, Mw is greater than about 4,500,000 and Mw/Mn is less than about 3. UHMWPE has a variety of uses. In particular, it can be advantageously used to make film, pressure pipe, large-part blow molding, extruded sheet, and many other articles. It can be used alone or blended with other resins. Techniques for making these articles are well known in the polyolefin industry.

The following examples merely illustrate the invention. Those skilled in the art will recognize many variations that are within the spirit of the invention and scope of the claims.

EXAMPLE 1

Polymerizing Ethylene with Supported 8-Quinolinoxytitanium Trichloride (A) Preparing 8-Quinolinoxytitanium Trichloride Under nitrogen, 8-quinolinol powder (1.45 g, 10.0 mmol) and heptane (100 mL) are added to a flask and stirred. The stirring rate is adjusted to prevent solids from depositing on the walls of the flask. Titanium tetrachloride (10 mL of 1.0 M solution in heptane) is added dropwise to the flask over 20 hours at 25° C. at a stirring rate effective to prevent solids from depositing on the walls of the flask. The reaction mixture changes from white to tomato-juice red. The solids are isolated by decanting the liquid portion. Residual solvent is removed from the solids under vacuum, resulting in a red solid, which is 8-quinolinoxytitanium trichloride (3.04 g).

(B) Supporting 8-Quinolinoxytitanium Trichloride

Silica (Davison 948, 5.0 g) is pretreated with HMDS and then calcined 4 h at 600° C. The treated silica is suspended in heptane (25 mL). Dibutylmagnesium (5.0 mL of 10 wt. % solution in heptane, 3.0 mmol) is added to the silica suspension under nitrogen at 25° C. 8-Quinolinoxytitanium trichloride (1.0 mmol) is dissolved in dichloromethane (25 mL) to give a purple solution. This solution is then added to the above mixture at 25° C. under nitrogen over 1 h. The solvent is removed by nitrogen purge, and the catalyst is dried under vacuum for 0.5 h.

(C) Polymerizing Ethylene

Polymerization is conducted in a 2L stainless steel pressure reactor. The reactor is heated at 130° C. for an hour, purged with nitrogen three times, and then sealed and cooled to 25° C. The supported quinolinoxytitanium trichloride (0.05 g), triethylaluminum (TEAL) (0.60 mL, 1.6 M in isobutane), and isobutane (1,000 mL) are charged into the reactor. After the reactor contents are heated to 60° C., ethylene, dried by passing through 13× molecular sieves, is fed into the reactor via a pressure regulator to start the polymerization. The polymerization is performed at 60° C. by continuously feeding ethylene to maintain the reactor pressure at 500 psi. The polymerization is terminated by venting the reactor. Butylated hydroxytoluene (1,000 ppm) is added to the polymer. The polymer is dried for an hour at 80° C. under vacuum. It has Mw: 5,300,000 and Mw/Mn: 2.52. The catalyst activity is 1,200 kg PE/mol cat/h.

COMPARATIVE EXAMPLE 2

Polymerizing Ethylene with Unsupported 8-Quinolinoxytitanium Trichloride

The general polymerization procedure of Example 1, step (C) is repeated, but unsupported 8-quinolinoxytitanium trichloride is used. The polyethylene has Mw: 5,100,000 and Mw/Mn: 2.62. The catalyst activity is only 600 kg PE/mol cat/h.

EXAMPLE 3

Polymerizing Ethylene with Supported 8-Quinolinoxytitanium Tribenzyl

8-Quinolinoxytitanium trichloride (0.060 g, 0.2 mmol, prepared in Example 1) is mixed with toluene (10 mL). Benzylmagnesium chloride (0.60 mL of 1.0 M solution in diethyl ether, 0.60 mmol) is added to the mixture with stirring at 25° C., resulting in a purple solution of 8-quinolinoxytitanium tribenzyl (10 mL, 0.2 mmol). The catalyst is supported onto silica according to the general procedure of Example 1, step (B).

Ethylene is polymerized according to the general procedure of Example 1, step (C) with the supported 8-quinolinoxytitanium tribenzyl catalyst. The polyethylene has Mw: 5,420,000 and Mw/Mn: 2.50. The catalyst activity is 38,400 kg PE/mol cat/h.

COMPARATIVE EXAMPLE 4

Polymerizing Ethylene with Unsupported 8-Quinolinoxytitanium Tribenzyl

The general polymerization procedure of Example 1, step (C) is repeated, but unsupported 8-quinolinoxytitanium tribenzyl is used. The polymer has Mw: 5,000,000 and Mw/Mn: 2.72. The catalyst activity is only 6,000 kg PE/mol cat/h.

EXAMPLE 5

Polymerizinq Ethylene with Supported 8-Quinolinoxytitanium Tribenzyl

The procedure of Example 3 is repeated, but the treatment of silica with dibutylmagnesium is omitted from step (B). The polyethylene has Mw: 5,300,000 and Mw/Mn: 2.61. The catalyst activity is 26,400 kg PE/mol cat/h.

As shown in Table 1, the process of the invention, in which the quinolinoxy-containing single-site catalysts are supported, gives much higher catalyst activities than the process that uses unsupported catalysts. Moreover, Table 2 shows that UHMWPE made by the process of the invention has significantly improved tensile properties and impact resistance.

COMPARATIVE EXAMPLE 6

The procedure of Example 1 is repeated, but methyl alumoxane (MAO) is used as the activator instead of TEAL. An UHMWPE is not obtained.

COMPARATIVE EXAMPLE 7

The procedure of Example 1 is repeated, but toluene is used as solvent instead of isobutane. An UHMWPE is not obtained.

COMPARATIVE EXAMPLE 8

The procedure of Example 1 is repeated, but before ethylene is fed, the reactor is pressured by 100 psi of hydrogen. An UHMWPE is not obtained.

TABLE 1

Catalyst Activity

| Example No. | Catalyst | Catalyst Activity kg PE/mol cat/h |
|---|---|---|
| 1 | Supported 8-quinolinoxytitanium trichloride | 1,200 |
| C2 | Unsupported 8-quinolinoxytitanium trichloride | 600 |
| 3 | Supported 8-quinolinoxytitanium tribenzyl | 38,400 |
| C4 | Unsupported 8-quinolinoxytitanium tribenzyl | 6,000 |
| 5 | Supported 8-quinolinoxytitanium tribenzyl | 26,400 |

TABLE 2

Physical Properties of UHMWPE

| Ex. No. | Density[1] g/cc | Tensile[2] MPa | Elongation[2] % | Yield[2] MPa | Tensile[2] Modulus | Izod[3] Impact kj/m² |
|---|---|---|---|---|---|---|
| 1 | 0.939 | 48.7 | 336 | 25.3 | 1107 | 156 |
| C2 | 0.935 | 45.2 | 302 | 22.6 | 775 | 132 |
| 3 | 0.938 | 49.8 | 351 | 24.1 | 890 | 146 |
| C4 | 0.936 | 46.3 | 306 | 23.1 | 790 | 135 |

Test Methods: 1-ASTM D-792; 2-ASTM D-638; 3-ASTM D-4020-96.

I claim:

1. A process for producing polyethylene, which comprises (a) supporting a single-site catalyst selected from 8-quinolinoxytitanium trichloride or 8-quinolinoxytitanium tribenzyl onto a support; and (b) polymerizing ethylene at a temperature within the range of about 40° C. to about 110° C. in the presence of the supported catalyst of step (a) and a non-alumoxane activator, in the absence of aromatic solvent, α-olefin comonomer, and hydrogen, said polyethylene having a weight average molecular weight (Mw) greater than about 3,000,000 and molecular weight distribution (Mw/Mn) less than about 5.0.

2. The process of claim 1 wherein the support is selected the group consisting of silica, alumina, silica-aluminas, magnesias, titanias, zirconias, magnesium chloride, and crosslinked polystyrene.

3. The process of claim 1 wherein the support is treated with an organosilicon compound, calcined, and then treated with an organomagnesium compound.

4. The process of claim 3 wherein the support is a silica, the organosilicon compound is hexamethyldisilazane, and the organomagnesium compound is dibutylmagnesium.

5. The process of claim 1 wherein the single-site catalyst is 8-quinolinoxytitanium trichloride.

6. The process of claim 1 wherein the single-site catalyst is 8-quinolinoxytitanium tribenzyl.

7. The process of claim 1 wherein the non-alumoxane activator is selected from the group consisting of trialkyl amines, alkyl aluminums, alkyl aluminum halides, anionic compounds of boron or aluminum, trialkyl boron compounds, triaryl boron compounds, and mixtures thereof.

8. The process of claim 1 wherein the activator is triethyl aluminum.

9. The process of claim 1 wherein the polymerization of ethylene is performed in slurry phase.

10. The process of claim 1 wherein the polymerization of ethylene is performed in gas phase.

* * * * *